US008959765B2

(12) United States Patent
Ringenberger et al.

(10) Patent No.: US 8,959,765 B2
(45) Date of Patent: Feb. 24, 2015

(54) METHOD FOR MAKING A TEMPORARY TURBOCHARGER COMPRESSOR SEAL AND TEMPORARY TURBOCHARGER COMPRESSOR SEAL MADE BY SAME

(75) Inventors: Rhett Ringenberger, Lafayette, IN (US); Jeffrey A. Wagner, Delphi, IN (US)

(73) Assignee: Caterpillar Inc., Peoria, IL (US)

( * ) Notice: Subject to any disclaimer, the term of this patent is extended or adjusted under 35 U.S.C. 154(b) by 187 days.

(21) Appl. No.: 13/558,578

(22) Filed: Jul. 26, 2012

(65) Prior Publication Data

US 2014/0030062 A1     Jan. 30, 2014

(51) Int. Cl.
*B23P 6/00*     (2006.01)

(52) U.S. Cl.
USPC ....... 29/888.021; 29/888.3; 29/447; 277/923; 277/944

(58) Field of Classification Search
CPC ...... B23P 6/007; F10D 5/005; F05B 2230/80; F16J 15/32; F16J 15/3284; F16J 2015/085; F16J 15/0825

USPC ............ 29/888.02, 888.021, 888.011, 888.3, 29/447, 505, 509, 521, 525.01, 525.05, 29/525.13, 525.15; 277/314, 923, 931, 277/933, 944; 415/175

See application file for complete search history.

(56) References Cited

U.S. PATENT DOCUMENTS

| | | | |
|---|---|---|---|
| 3,667,988 A | 6/1972 | Horiki | |
| 4,489,116 A | 12/1984 | Flood | |
| 4,676,717 A * | 6/1987 | Willyard et al. | 415/196 |
| 4,757,595 A | 7/1988 | Fraering, Jr. | |
| 5,523,165 A | 6/1996 | Walter et al. | |
| 5,862,911 A | 1/1999 | Phillips, II et al. | |
| 2004/0118802 A1 | 6/2004 | Lysfjord et al. | |

FOREIGN PATENT DOCUMENTS

| | | |
|---|---|---|
| EP | 0 331 455 | 1/1989 |
| JP | 2000-62854 A | 2/2000 |
| JP | 2009-085880 A | 4/2009 |

* cited by examiner

*Primary Examiner* — Ryan J Walters
(74) *Attorney, Agent, or Firm* — Miller, Matthias & Hull

(57) ABSTRACT

A method for temporarily sealing a turbocharger compressor outlet and the seal for doing same are disclosed. The seal may include a layer of lubricant, a cover, and a layer of heat-shrink material. The seal creates a temporary water-tight seal around a turbocharger compressor outlet preventing damage to the inside of the turbocharger while the turbocharger is not in use.

7 Claims, 5 Drawing Sheets

US 8,959,765 B2

METHOD FOR MAKING A TEMPORARY TURBOCHARGER COMPRESSOR SEAL AND TEMPORARY TURBOCHARGER COMPRESSOR SEAL MADE BY SAME

FIELD OF THE DISCLOSURE

The present disclosure generally relates to turbochargers and, more particular, relates to seals for temporarily protecting the outlet of a turbocharger.

BACKGROUND OF THE DISCLOSURE

Turbochargers increase the volume of air an internal combustion engine takes into the combustion chamber during each cycle. The turbocharger accomplishes this by drawing in air, compressing the air, and forcing the compressed air into the combustion chamber. The increased air intake allows for more powerful combustion and therefore a more powerful engine.

While effective, when the turbocharger is being stored or transported, there is a possibility that water, dust, gravel, or other foreign agents may enter the turbocharger through the turbocharger compressor outlet. These foreign agents may damage the turbocharger or engine by creating rust, blocking passages, or by some other means, rendering the equipment less effective, or even inoperative. Not only will this result in less performance for the turbocharger and engine, but also can require substantial man-hours to repair same.

As a result, turbocharger compressor outlets are often temporarily covered after manufacture to keep the potentially damaging entities out of the turbocharger. After purchase and prior to use, the temporary cover is removed to enable the turbocharger and engine to operate. Historically, simple metal covers and band-clamps have been used to keep large foreign objects out of the turbocharger, but such methods are neither water proof nor able to keep all other agents and fine particulate out of the turbocharger. Also, such methods are potentially damaging, specifically the use of band clamps which mechanically grip to the turbocharger compressor outlet.

SUMMARY OF THE DISCLOSURE

In accordance with one aspect of the disclosure, a method for sealing the outlet of a turbocharger compressor is disclosed, which may comprise applying lubricant to the turbocharger compressor outlet, installing a cover over the lubricated turbocharger compressor outlet, positioning a heat-shrink material around the turbocharger compressor outlet, and shrinking the heat-shrink material around the turbocharger compressor outlet and cover.

In accordance with another aspect of the disclosure, a seal for the outlet of a turbocharger compressor is disclosed, which may comprise a layer of lubricant covering a flange of the turbocharger compressor outlet, a cover positioned over the layer of lubricant, and a layer of heat-shrink material positioned around the cover.

In accordance with a still further aspect of the disclosure, an engine is disclosed, which may comprise an engine block, a plurality of cylinders disposed in the engine block, a plurality of pistons disposed in the plurality of cylinders, a turbocharger in fluid communication with the plurality of cylinders, an outlet for the turbocharger compressor, a layer of lubricant positioned around the turbocharger compressor outlet, a cover positioned over the layer of lubricant, and a layer of heat-shrink material positioned around the cover and layer of lubricant.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
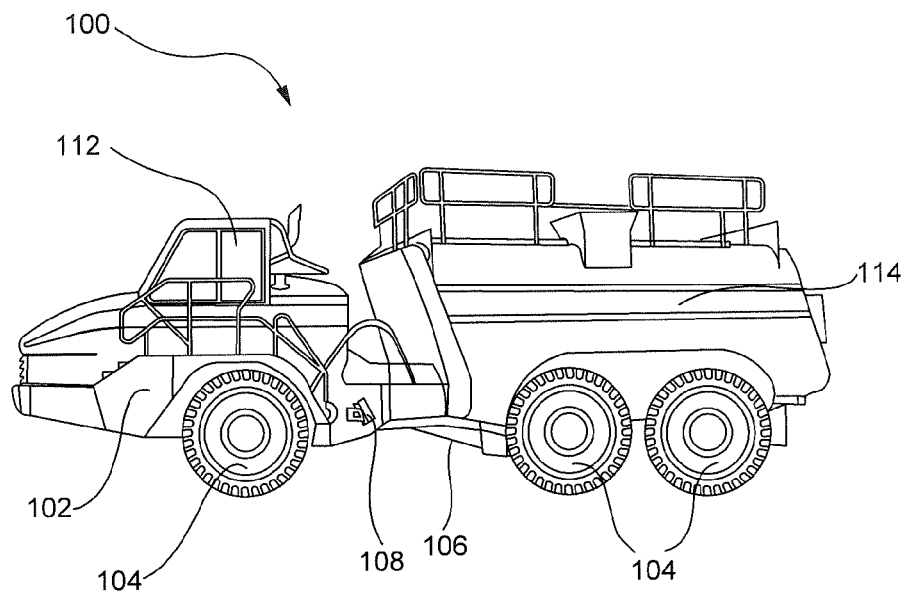
FIG. 1 is a side view of a machine constructed in accordance with the teachings of the present disclosure.

Referring now to the drawings, and with specific reference to FIG. 1, a machine constructed in accordance with the teachings of the present disclosure is generally referred to by reference numeral 100. While the following disclosure will be provided with primary reference to a machine 100, it is to be understood that the teachings of this disclosure could be used with equal efficacy in conjunction with any machine that comprises an internal combustion engine and turbocharger, including but not limited to, a truck as shown, a wheel loader, a track-type tractor, and the like.

As shown, the machine 100 may include a chassis 102 supported by a plurality of wheels 104, connected to, by way of an axle 106, a drive shaft 108. The driveshaft 108 in turn may be connected to an engine 110. The engine 110 may be supported by the chassis 102, as are an operator cabin 112 and one or more working elements 114.

Figure 2:
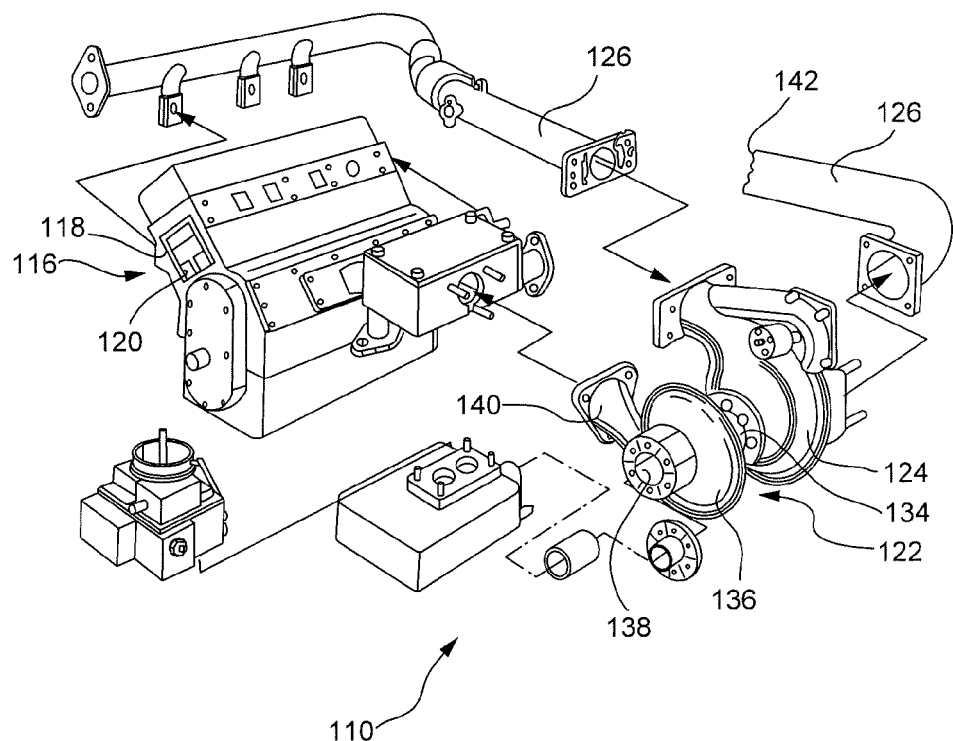
FIG. 2 is a exploded view of an engine constructed in accordance with the teachings of the present disclosure.

With reference now to FIG. 2, the engine 110 can be seen to include an engine block 116 including of a plurality of cylinders 118, each housing a reciprocating piston 120. Each cylinder 118 can also be seen to be in connection with a turbocharger 122 by way of a channel 126. The turbocharger 122 may include a turbine housing 124 in which a set of turbine blades 128 rotate.

Figure 3:
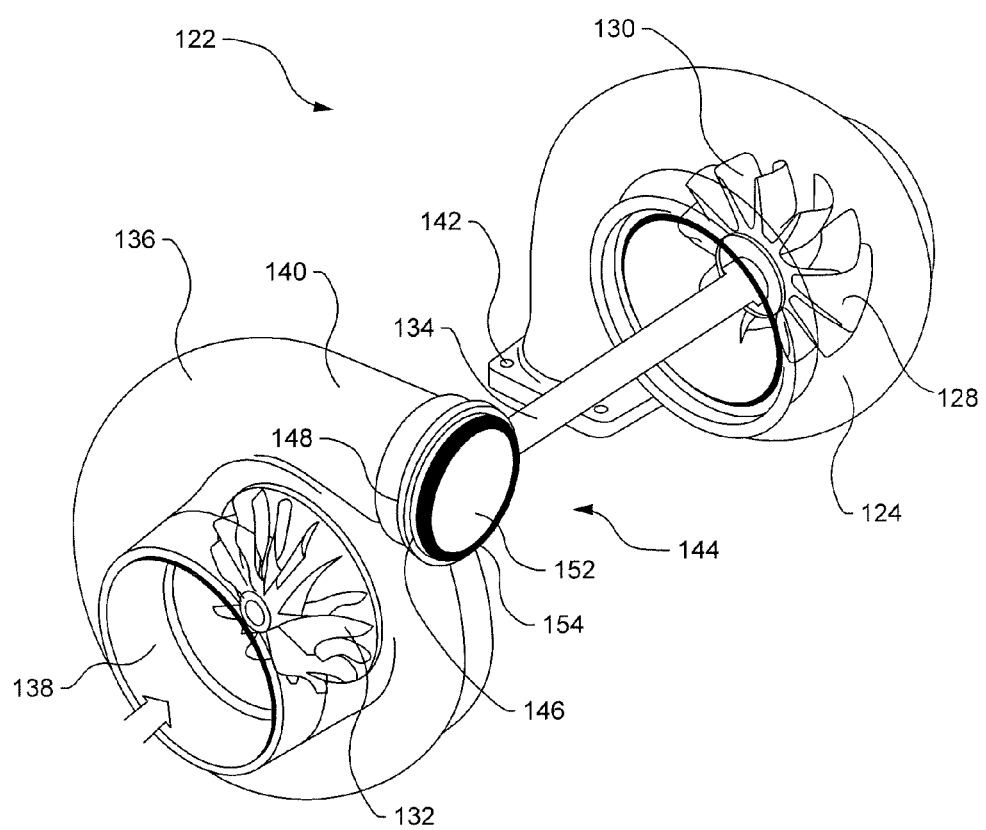
FIG. 3 is a perspective view of a turbocharger with temporary seal constructed in accordance with the present disclosure.

As shown in FIG. 3, a turbine 130 is in communication with a compressor 132 through a turbocharger shaft 134, and when the turbine 130 rotates, the turbocharger shaft 134 and the compressor 132 rotate. The rotating compressor 132 draws air through the air intake 138 into a compressor housing 136 and forces the air out the turbocharger compressor outlet 140 and into the cylinder 118 by way of the channel 126 (see FIG. 2) to facilitate more powerful combustion.

Turning now to FIG. 4a-d, a sample sequence of steps to temporarily seal the turbocharger compressor outlet 140 are shown in accordance with the teachings of this disclosure. Starting with FIG. 4a, to create a temporary seal 144 around the turbocharger compressor outlet 140, a lubricant 146 may first be applied to a flange 148 of the turbocharger compressor outlet 140. In one embodiment, the lubricant 146 may be a Multi-Purpose NGLI #2 Lithium grease, but other lubricants 146 such as, but not limited to, petroleum based products, synthetic petrol products, or high viscosity liquids, can be used. The flange 148 covered by the lubricant 146 may be for example, the first 50 mm (1.97 inches) from the edge 150 of the turbocharger compressor outlet 140, but other lubricated areas and dimensions are certainly possible and encompassed by the scope of this disclosure. In addition, to form an effective seal, the lubricant 146 should be applied around the entire circumference of the turbocharger compressor outlet 140.

Figure 4A:
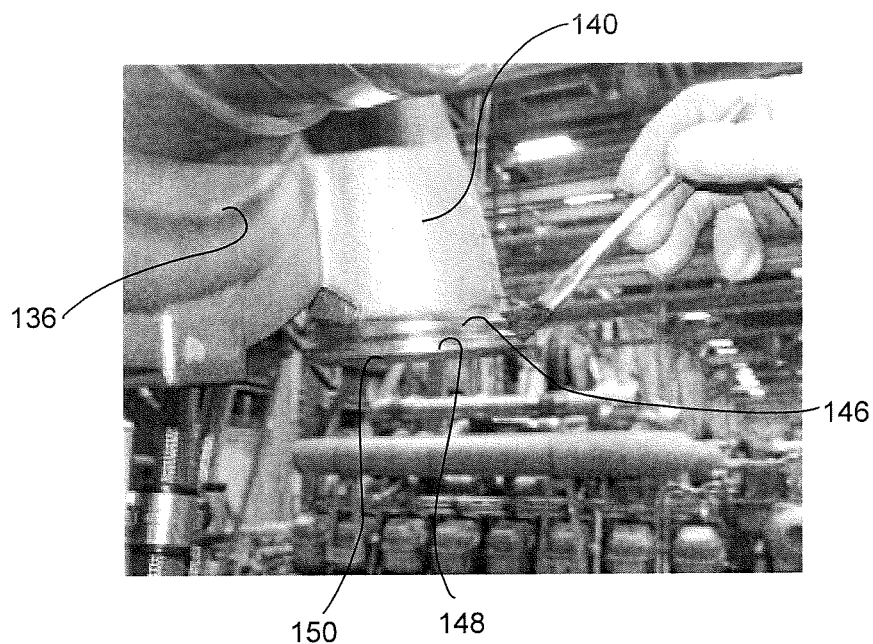
FIG. 4a is a perspective view of a lubricant being applied to a turbocharger compressor outlet in accordance with the method of the present disclosure.
Figure 4B:
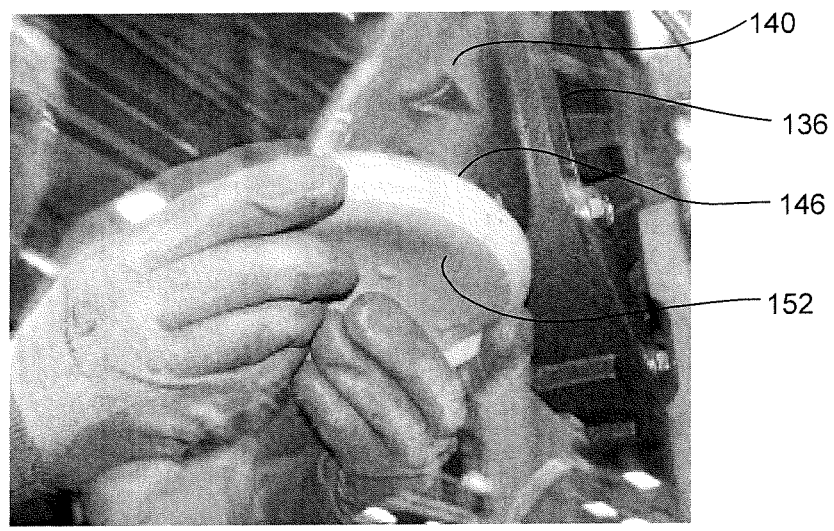
FIG. 4b is a perspective view of a cover being applied to a turbocharger compressor outlet after the lubricant is applied.

Once the lubricant 146 is applied, as shown in FIG. 4b, a cover 152 may be positioned over the turbocharger compressor outlet 140 and the lubricant 146. In order to make an effective seal, the cover 152 may be made of an elastomeric material such as but not limited to, polyacrylate, molded rubber, chlorobutyl, chloroprene, ethylene-propylene-diene, perfluoroelastomer, hydrogenated nitrile, low temperature nitrile, natural rubber, or silicone. The cover 152 is dimensioned to have a size closely matching that of the turbocharger outlet 140 and may include a circumferential lip or the like to ensure an interference fit therewith.

Figure 4C:
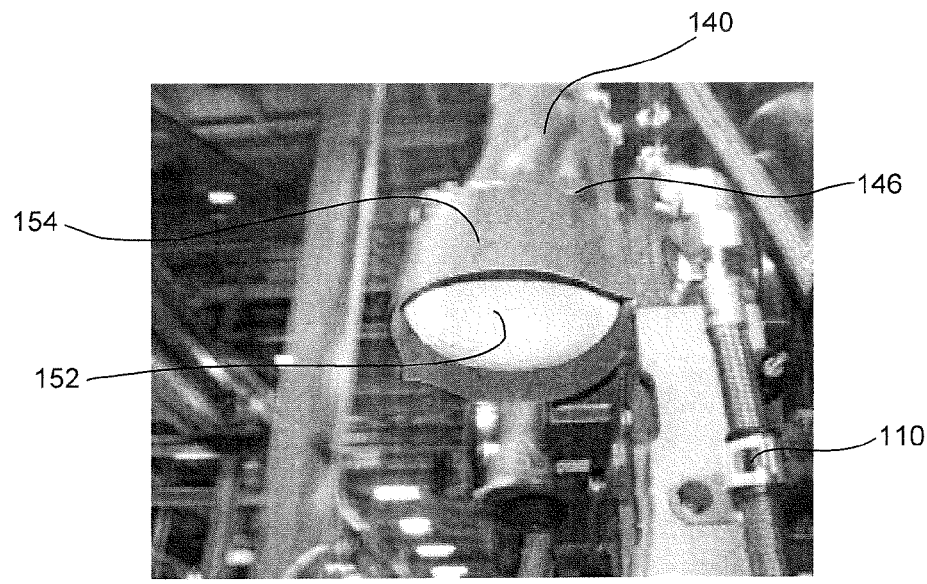
FIG. 4c is a perspective view of a heat-shrink material being applied to a turbocharger compressor outlet after the cover is applied.

After the cover 152 is installed, a heat-shrink material 154 may be positioned around the turbocharger compressor outlet 140, the lubricant 146, and the cover 152. The heat-shrink material 154 may be provided and applied in a tubular or cylindrical shape to best match the shape of the cover 152 and outlet 140, but the heat-shrink material 154 may be alternatively provided as well. For example, the heat-shrink material 154 may be provided in a sheet-like or planar configuration and be wrapped around the cover 152 and outlet 140. In addition, the shrink-wrap material may be manufactured from any number of different polymeric materials, including but not limited to thermoplastics such as polyolefin. Once properly positioned as shown in FIG. 4c, the heat-shrink material 154 may then be shrunk with a heat gun or the like until the heat-shrink material 154 fits snugly around the turbocharger compressor outlet 140 and the cover 152 forming a water-tight seal. Temperature in the range of 450° C. to 550° C. may be used to ensure satisfactory shrinkage of the material 154. This is particularly true if the material 154 is polyolefin, but other temperature ranges are certainly possible, particularly if other shrink-wrap materials 154, other than polyolefin, are used.

Figure 4D:
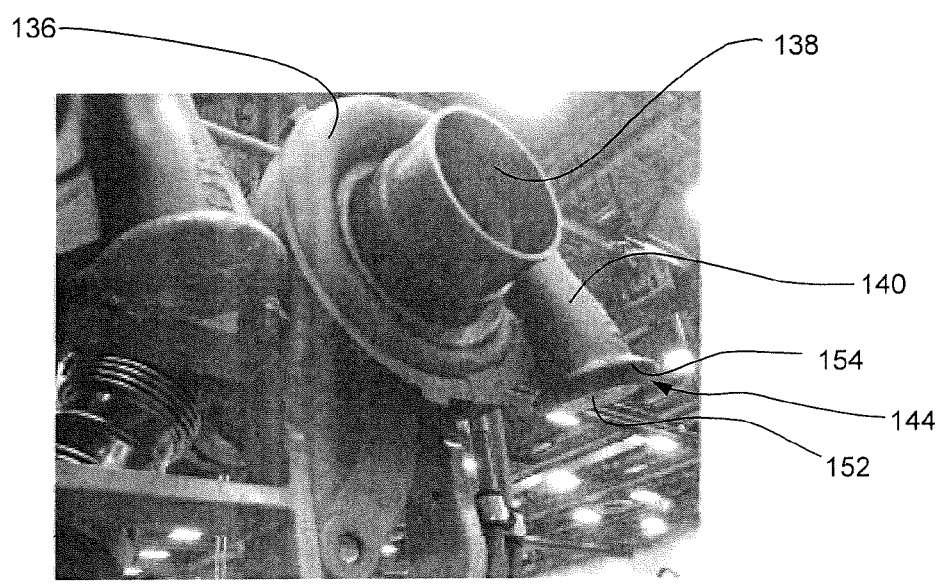
FIG. 4d is a perspective view of a finished seal after the heat-shrink material is heated and shrunk.

A completed seal 144 is depicted in FIG. 4d. The seal 144 may remain on the outlet 140 while being transported for sale and/or to a worksite. In so doing, the turbocharge outlet 140 is substantially seated, and thus protected, against large particles such as dirt and gravel, as well as small particulates such as water vapor. Once the user is ready to begin use, the temporary seal 144 can be removed with a knife or the like to ensure proper operation of the turbocharger.

Figure 5:
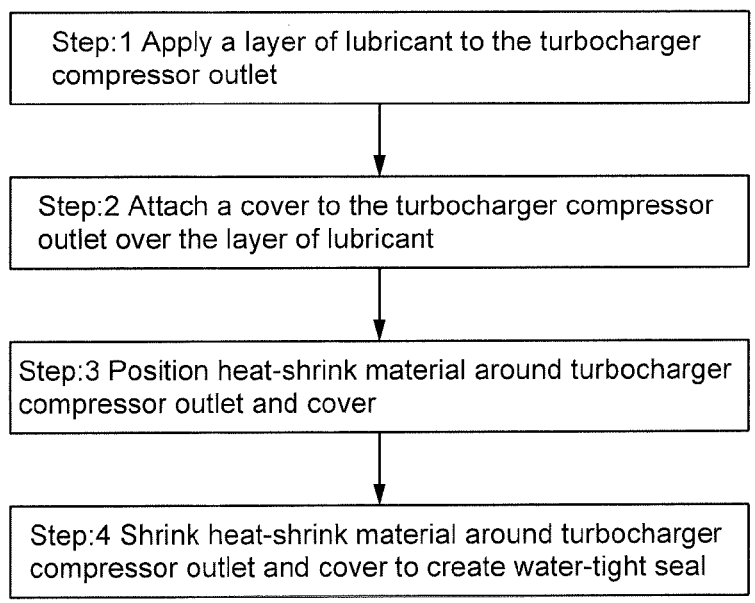
FIG. 5 is a flowchart depicting a sample sequence of steps which may be practiced in accordance with the method of the present disclosure.

In operation, the steps of the method of making the seal 144 and the order in which the steps proceed is presented in FIG. 5. The method of making a water-tight seal 144 on a turbocharger compressor outlet 140 may begin by applying a layer of lubricant 146 to the turbocharger compressor outlet 140. Once the lubricant 146 has been sufficiently applied, a cover 152 is attached to the turbocharger compressor outlet 140 over the lubricant 146. A layer of heat-shrink material 154 is then positioned around the cover 152 and the turbocharger compressor outlet 140. The heat-shrink material 154 is heated and shrunk around the turbocharger compressor outlet 140 and cover 152 to create a water-tight seal 144.

INDUSTRIAL APPLICABILITY

From the foregoing, it can be seen that the technology disclosed herein has industrial applicability in a variety of settings such as, but not limited to creating a temporary water-tight seal for a turbocharger compressor outlet on an internal combustion engine. The internal combustion engine with turbocharger may be used in conjunction with, but not be limited to, various earth moving, industrial, construction or agricultural machines such as: wheel loaders, track-type loaders, articulated trucks, and the like. Using the teachings of the present disclosure, a temporary water-tight seal is able to protect the inside of a turbocharger from water, dust, gravel, and the elements of nature from the moment of manufacture, through sale and distribution to the customer and right up until time of use. This is a significant departure from prior art devices and methods which either left the turbocharger completely open to the elements and other mechanical or corrosive damage, or which could not protect against water and only offered limited protection from dust and the elements of nature. In so doing, the resulting turbocharger, engine, and machine employing same may enjoy a longer serviceable life with less maintenance costs to the consumer.

What is claimed is:

1. A method of sealing an outlet of a turbocharger compressor, comprising:
    applying lubricant to the turbocharger compressor outlet;
    installing a cover over the lubricated turbocharger compressor outlet;
    positioning heat-shrink material around the turbocharger compressor outlet; and
    shrinking the heat-shrink material around the turbocharger compressor outlet and the cover.

2. The method of claim 1, wherein the heat-shrink material is shrunk until forming a water-tight seal.

3. The method of claim 1, wherein the lubricant is a Multi-Purpose EP NLGI #2 Lithium grease.

4. The method of claim 1, wherein the cover is made of an elastomeric material.

5. The method of claim 4, wherein the elastomeric material is an elastomer selected from the group consisting of polyacrylate, molded rubber, chlorobutyl, chloroprene, ethylene-propylene-diene, perfluoroelastomer, hydrogenated nitrile, low temperature nitrile, natural rubber, and silicone.

6. The method of claim 1, wherein the heat-shrink material is shrunk by a heat gun.

7. The method of claim 1 wherein the heat-shrink material is a thermo-plastic.

* * * * *